(12) United States Patent
Patel et al.

(10) Patent No.: US 9,235,510 B2
(45) Date of Patent: Jan. 12, 2016

(54) PROCESSOR WITH KERNEL MODE ACCESS TO USER SPACE VIRTUAL ADDRESSES

(71) Applicant: MIPS Technologies, Inc., Sunnyvale, CA (US)

(72) Inventors: Sanjay Patel, San Ramon, CA (US); Chris Dearman, Sunnyvale, CA (US); Ranganathan Sudhakar, Santa Clara, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 332 days.

(21) Appl. No.: 13/683,875

(22) Filed: Nov. 21, 2012

(65) Prior Publication Data

US 2013/0132702 A1 May 23, 2013

Related U.S. Application Data

(60) Provisional application No. 61/562,952, filed on Nov. 22, 2011.

(51) Int. Cl.
| | | |
|---|---|---|
| *G06F 12/00* | (2006.01) | |
| *G06F 12/08* | (2006.01) | |
| *G06F 12/10* | (2006.01) | |
| *G06F 12/14* | (2006.01) | |

(52) U.S. Cl.
CPC .............. *G06F 12/08* (2013.01); *G06F 12/109* (2013.01); *G06F 12/14* (2013.01); *G06F 12/1491* (2013.01)

(58) Field of Classification Search
CPC ... G06F 12/08; G06F 12/109; G06F 12/1491; G06F 12/14; G06F 12/16

USPC ........................................................ 711/202
See application file for complete search history.

(56) References Cited

U.S. PATENT DOCUMENTS

| | | | | |
|---|---|---|---|---|
| 5,303,378 | A * | 4/1994 | Cohen ........................... | 710/264 |
| 5,317,726 | A * | 5/1994 | Horst ................... | G06F 11/0724 |
| | | | | 714/12 |
| 5,832,299 | A * | 11/1998 | Wooten ............................. | 710/9 |
| 6,711,625 | B1 * | 3/2004 | Simpson ............... | G06F 3/1204 |
| | | | | 370/473 |
| 2004/0210764 | A1 * | 10/2004 | McGrath et al. .............. | 713/200 |
| 2004/0250063 | A1 * | 12/2004 | Gulick et al. ................. | 713/160 |
| 2005/0055524 | A1 * | 3/2005 | Gulick et al. ................. | 711/166 |
| 2007/0169070 | A1 | 7/2007 | Drepper | |
| 2008/0244206 | A1 | 10/2008 | Heo et al. | |
| 2011/0202927 | A1 | 8/2011 | Miloushev et al. | |
| 2012/0216242 | A1 * | 8/2012 | Uner et al. ......................... | 726/1 |
| 2012/0284485 | A1 * | 11/2012 | Yamada .............. | G06F 12/1045 |
| | | | | 711/203 |
| 2012/0331480 | A1 * | 12/2012 | Ertugay .................. | G06F 9/545 |
| | | | | 719/312 |

OTHER PUBLICATIONS

International Search Report and Written Opinion, issued to international patent application No. PCT/US12/65485, Jan. 29, 2013, 7 pgs.

\* cited by examiner

*Primary Examiner* — Mardochee Chery
(74) *Attorney, Agent, or Firm* — Cooley LLP

(57) ABSTRACT

A computer includes a memory and a processor connected to the memory. The processor includes memory segment configuration registers to store defined memory address segments and defined memory address segment attributes such that the processor operates in accordance with the defined memory address segments and defined memory address segment attributes to allow kernel mode access to user space virtual addresses for enhanced kernel mode memory capacity.

24 Claims, 5 Drawing Sheets

| Segment | Virtual Address Range | Segment Name(s) |
|---|---|---|
| 0 | 0xFFFF FFFF through 0xE000 0000 | kseg3 |
| 1 | 0xDFFF FFFF through 0xC000 0000 | ksseg, sseg |
| 2 | 0xBFFF FFFF through 0xA000 0000 | kseg1 |
| 3 | 0x9FFF FFFF through 0x8000 0000 | kseg0 |
| 4 | 0x7FFF FFFF through 0x4000 0000 | kuseg, useg, suseg |
| 5 | 0x3FFF FFFF through 0x0000 0000 | kuseg, useg, suseg |

FIG. 3

PROCESSOR WITH KERNEL MODE ACCESS TO USER SPACE VIRTUAL ADDRESSES

CROSS-REFERENCE TO RELATED APPLICATION

This application claims priority to U.S. Provisional Patent Application Ser. No. 61/562,952, filed Nov. 22, 2011, entitled "MIPS32 Enhanced VA Scheme", the contents of which are incorporated herein by reference.

FIELD OF THE INVENTION

This invention relates generally to memory management in computers. More particularly, this invention relates to a processor with kernel mode access to user space virtual addresses.

BACKGROUND OF THE INVENTION

Processors sold by MIPS Technologies®, Sunnyvale, Calif., use and handle addresses in a unique manner. FIG. 1 illustrates a MIPS virtual memory map for a 32-bit processor. The memory map includes fixed memory address segments. Each fixed memory address segment has fixed attributes, such as access mode, cache features and memory map features. In particular, there is a defined user mode region 102 and kernel mode regions 104, 106, 108 and 110.

MIPS processors have three operating modes: user mode, supervisor mode and kernel mode. In user mode, a single, uniform virtual address space is available. This uniform virtual address space is referred to as a user segment. The supervisor mode is designed for operating systems. In supervisor mode, the processor operates in a kernel mode and the operating system runs in supervisor mode. The processor is in kernel mode whenever an exception is detected and it remains in kernel mode until an Exception Return (ERET) instruction is executed. The ERET instruction restores the processor to the mode existing prior to the exception.

The memory map includes a user space region called "kuseg" 102. This user space region supports user mode. The user space region is a 2 GB region spanning virtual addresses 0x0000 0000 through 7FFF FFFF. These addresses are translated by a Memory Management Unit (MMU).

For the kernel mode, there is an unmapped cached region called "kseg0" 104. This region is 512 MB ranging from virtual address 0x8000 000 through 9FFF FFFF. These virtual addresses are translated into physical addresses by stripping off the top 3 most significant bits and mapping them contiguously into the lower 512 MB of physical memory. Addresses in this region are almost always accessed through the cache. The addresses are used for most programs and data in systems not using an MMU and are used by the Operating System (OS) kernel for systems that use an MMU.

The unmapped and uncached region is called "kseg1" 106. This region is also 512 MB, with virtual addresses ranging from 0xA000 0000 through BFFF FFFF. These virtual addresses are mapped into physical addresses by stripping off the leading 3 bits, giving a duplicate mapping of the lower 512 MB of physical memory. In this space, access does not rely upon the cache.

The mapped region is called "kseg2" 108 and "kseg3" 110. This 1 GB region spans virtual addresses 0xC000 0000 through FFFF FFFF. This area is only accessible in kernel mode. This region is translated through the MMU.

Thus, the fixed address segmentation map of the MIPS architecture limits "kseg0" to 512 MB of system memory. Some architectures work around this limitation by utilizing a HighMem enhancement to Linux®. HighMem gives the OS the flexibility of accessing memory that is not accessible through Kseg0. HighMem allows the kernel to create temporary mappings on the fly to access high-memory, thus extending physical memory that can be accessed. This process of creating mappings on the fly has a performance penalty. Further, the additional address space is limited in how it can be used.

In view of the foregoing, it would be desirable to provide an alternate approach to expand the amount of physical memory accessible in kernel mode.

SUMMARY OF THE INVENTION

A disclosed method includes storing defined memory address segments and defined memory address segment attributes in registers of a processor. The processor is operated in accordance with the defined memory address segments and defined memory address segment attributes to allow kernel mode access to user space virtual addresses for enhanced kernel mode memory capacity.

A disclosed computer includes a memory and a processor connected to the memory. The processor includes memory segment configuration registers to store defined memory address segments and defined memory address segment attributes such that the processor operates in accordance with the defined memory address segments and defined memory address segment attributes to allow kernel mode access to user space virtual addresses for enhanced kernel mode memory capacity.

A disclosed processor includes memory segment configuration registers to store defined memory address segments and defined memory address segment attributes such that the processor operates in accordance with the defined memory address segments and defined memory address segment attributes to allow kernel mode access to user space virtual addresses for enhanced kernel mode memory capacity.

A disclosed computer readable storage medium includes executable instructions to define a processor with memory segment configuration registers to store defined memory address segments and defined memory address segment attributes such that the processor operates in accordance with the defined memory address segments and defined memory address segment attributes to allow kernel mode access to user space virtual addresses for enhanced kernel mode memory capacity.

BRIEF DESCRIPTION OF THE FIGURES

The invention is more fully appreciated in connection with the following detailed description taken in conjunction with the accompanying drawings, in which:

FIG. 3 illustrates a programmable memory segment scheme in accordance with an embodiment of the invention.

DETAILED DESCRIPTION OF THE INVENTION

Figure 2:
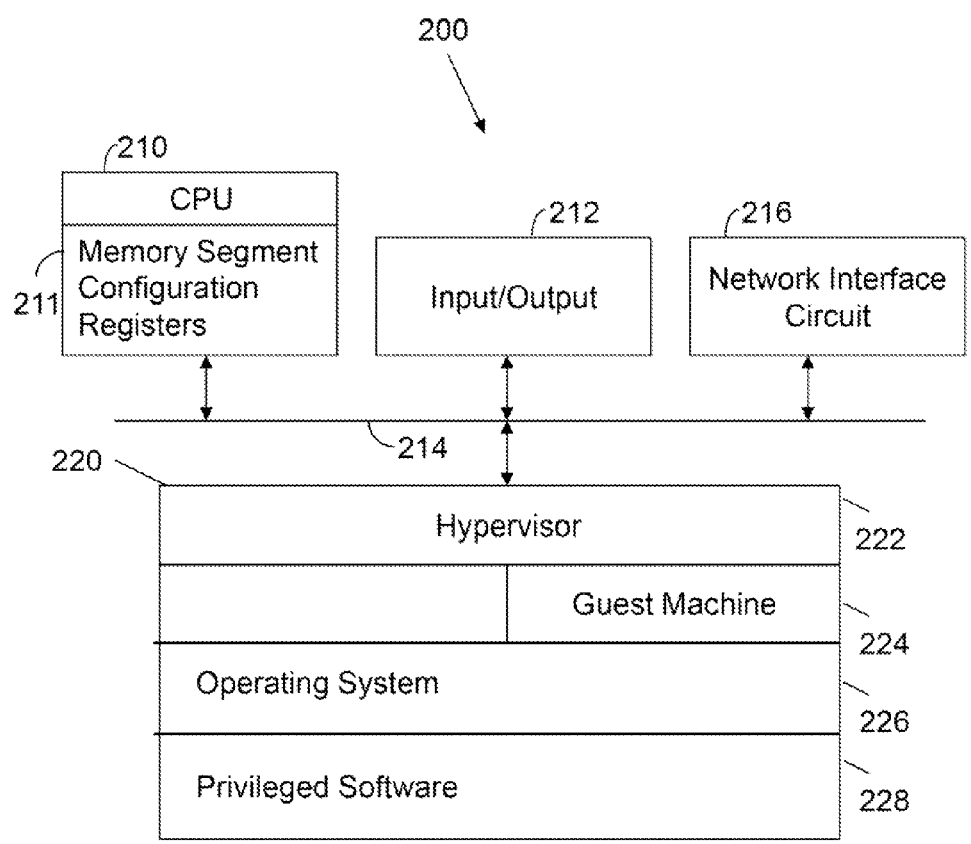
FIG. 2 illustrates a computer configured in accordance with an embodiment of the invention.

FIG. 2 illustrates a computer 200 implemented in accordance with an embodiment of the invention. In one embodiment, the computer 200 is a host machine with a central processing unit 210. The central processing unit 210 includes memory segment configuration registers 211. The memory segment configuration registers facilitate a customized definition of a memory map. For example, the memory segment configuration registers may specify a number of defined memory address segments and memory address segment attributes, such as access mode, cache feature and/or memory map feature.

This stands in contrast to the prior art. In the prior art, the accessibility mode (e.g., kernel only, kernel and supervisor, or kernel and supervisor and user) is fixed for each segment. A chosen segment is defined by the most significant address bits. The map-ability (e.g., use of memory management unit and translation look-aside buffer) is fixed for each segment. Finally, the cache-ability (e.g., the use of a cache) is also fixed for each segment. In an embodiment of the invention, the accessibility mode per segment is programmed into memory segment configuration registers 211 by privileged software, normally at power-up or boot time. Similarly, the map-ability per segment is programmed, as is the cache-ability per segment. As in the legacy system, the chosen segment is defined by the most significant address bits.

The computer 200 also includes input/output devices 212, which are connected to the CPU 210 via a bus 214. The input/output devices 212 may include a keyboard, mouse, display, printer and the like. A network interface circuit 216 is also connected to the bus 214. The network interface circuit 216 allows the computer 200 to operate in a networked environment.

A memory 220 is also connected to the bus 214. In one embodiment, the memory 220 stores a hypervisor 212, which may be used to implement a guest machine 224. This allows for virtualization of hardware resources. Virtualization refers to the creation of a virtual, rather than an actual, version of something, such as a hardware platform, operating system, a storage device or a network resource. For example, a computer that is running Microsoft® Windows® may host a virtual machine that looks like a computer with an Apple® operating system. Therefore, Apple® compliant software can be executed on the virtual machine.

In hardware virtualization, the term host machine refers to the actual machine on which the virtualization takes place. The term guest machine refers to the virtual machine. The software or firmware that creates a virtual machine on the host machine is called a hypervisor. In the MIPS legacy virtual address map, kseg0 and kseg1 cannot be relocated, which hinders virtualization.

The memory segment configuration registers 211 facilitate virtualization operations. However, the memory segment configuration registers 211 need not be used in connection with virtualization operations. Rather, the memory segment configuration registers 211 may be used in any number of modalities. For example, the memory segment configuration registers 211 may be used in connection with a standard operating system 226. In particular, as discussed below, the memory segment configuration registers 211 support kernel mode access to user space virtual addresses, thereby increasing memory available in the kernel mode.

The memory 220 may also store privileged software 228, which is used to write values to the memory segment configuration registers 211, typically at power-up. Therefore, the privileged software 228 may be in the form of boot code that writes to memory segment configuration registers to alternately configure the computer 200 in a legacy mode or the disclosed kernel mode with user space virtual address access. Register configurations for these alternate modes are demonstrated below.

FIG. 3 illustrates a 32-bit address space that may be divided into a set of custom memory segments in accordance with an embodiment of the invention. In this embodiment, there are six defined memory address segments. Exemplary virtual address ranges and segment names are also provided in FIG. 3. For segment 0, a segment register (e.g., SegReg0) may store memory address segment attributes defining access mode, cache-ability and map-ability. Corresponding segment register numbers may be used to store programmed values for the remaining segments.

Figure 4:
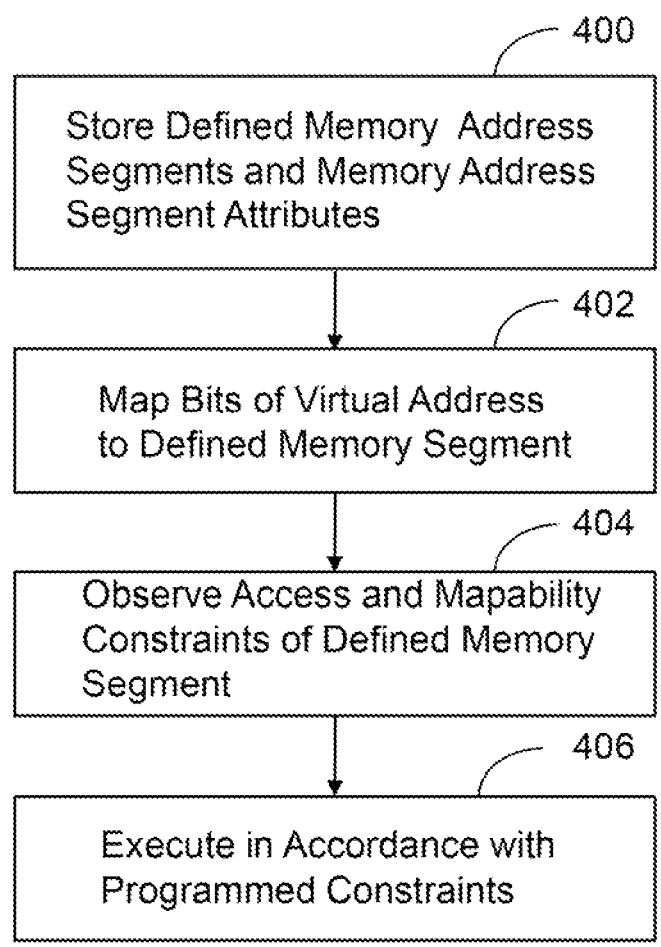
FIG. 4 illustrates processing operations associated with an embodiment of the invention.

FIG. 4 illustrates processing operations associated with an embodiment of the invention. Initially, defined memory address segments and memory address segment attributes are stored 400. For example, privileged software 228 may write values to the memory segment configuration registers 211. Thereafter, when a virtual address is received, bits from the virtual address are mapped to a defined memory segment 402. For example, the upper bits of the virtual address may be examined for mapping to a defined memory segment. The access and mapability constraints of the defined memory segment are then observed 404. An operation is then performed in accordance with the programmed constraints 406. For example, the programmed constraints may specify if access is allowed. If access is not allowed, then an exception is thrown. If access is allowed, then mapping constraints are checked. For example, if mapped access is not allowed, the upper bits of the virtual address may be dropped and the remaining bits may be used as a physical address. If mapped access is allowed, then a translation look-aside buffer (TLB) may be accessed with the virtual address. The TLB then outputs a physical address.

The memory segment configuration registers 211 may be implemented to set the following parameters:
- access permissions from user, kernel, and supervisor modes;
- enable mapping (address translation) using a memory management unit (MMU);
- physical address when mapping is disabled;
- cache attribute when mapping is disabled; and
- force to unmapped, uncached.

Figure 1:
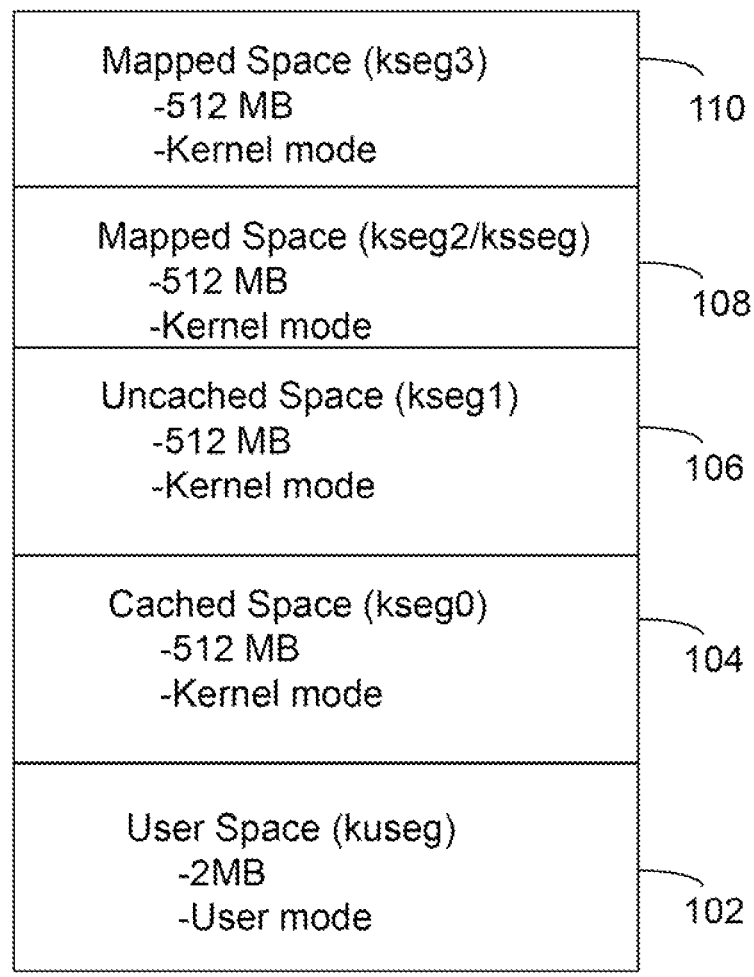
FIG. 1 illustrates a prior art fixed memory segment scheme.

In one embodiment, on reset, all segment configurations default to the fixed memory segment configuration of FIG. 1. The memory segment configuration registers may be used to implement a fully translated flat address space. Alternately, they may be used to alter the relative size of cached and uncached windows into the physical address space. Additional information on programmable memory address segments is available in the commonly owned pending patent application entitled "Programmable Memory Address Segments", Ser. No. 13/161,332, filed Jun. 11, 2011, the contents of which are incorporated herein by reference.

Programmable segmentation allows the privileges associated with an address segment to be programmed. Therefore, kseg0 does not have to be kernel, unmapped only. Instead, programmable segmentation is used to allow the kernel to view user space as an extended kseg0 (xkseg0). In this scheme, xkseg0 and useg share the same address range. This means that, if user space is for example 3 GB, the kernel has 3 GB of address space to access. Note that in the current base architecture, in kernel mode, the kernel can only access user virtual addresses through user mappings—never directly. Defining xkseg0 means that the kernel has direct access to the virtual addresses in kuseg. An embodiment of the invention establishes kernel mode user load/store instructions that are translated in the user address range (kuseg). An alternate approach is to have the load/store instructions bypass translation in kernel mode. Input/output addresses are mapped in kseg2 because xkseg0 addresses are treated as cached, while input/output addresses are uncached. Alternately, a separate kseg2 could be defined, but this limits the size of xkseg0 and thus the total available physical memory.

In one embodiment, xkseg0 is specified by setting segment access control mode bits to mapped user/supervisor, unmapped kernel (MUSUK). Kernel mode user load/store instructions allow the kernel to access user address space as if it were in user mode. For example, the kernel can copy from user address space to kernel physical address space by using such instructions with user virtual addresses. Kernel system calls from user space can be conveniently changed by replacing normal load/stores with such instructions. Switching modes (kernel to user) is an alternative, but this is an issue if the same virtual address is being simultaneously used by the kernel. Further, there is a performance penalty in context-switching.

The programmable segment xkseg0 is a shared segment in that user-mapped (typically associated with user mode user space kuseg) and kernel-unmapped (typically associated with kernel mode cached space kseg0) can simultaneously coexist. In a fixed segment scheme, a segment is either mapped or unmapped, but never both.

Figure 5:
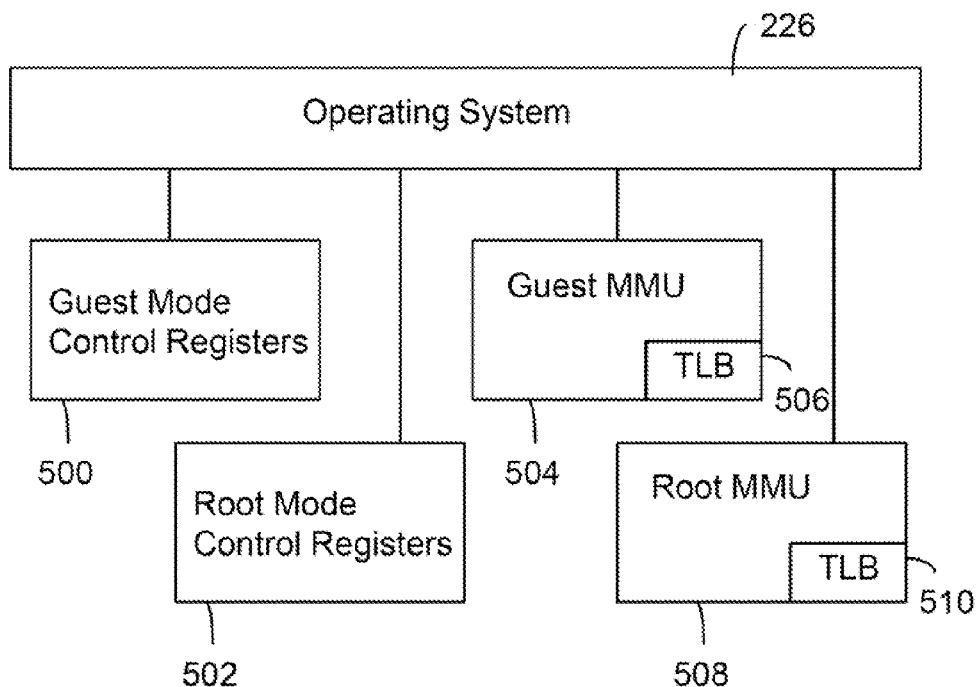
FIG. 5 illustrates interactions between an operating system, control registers and MMUs in accordance with an embodiment of the invention.

FIG. 5 illustrates address translation and access control resources that may be utilized in accordance with an embodiment of the invention. The operating system 226 of FIG. 1 (or the hypervisor 222) access hardware resources including a guest mode control registers 500 and root mode control registers 502. A guest MMU 504 has a translation look-aside buffer (TLB) 506 for virtual address to physical address translations. Similarly, a root MMU 508 has a translation look-aside buffer 510. Guest mode control registers 500 establish a guest operating mode wherein a guest virtual address is translated by TLB 506 to obtain a guest physical address. Thereafter, TLB 510 translates the guest physical address to a physical address. Such address translation operations are described in commonly owned U.S. Pat. No. 8,239,620, which is incorporated herein by reference.

Figure 6:
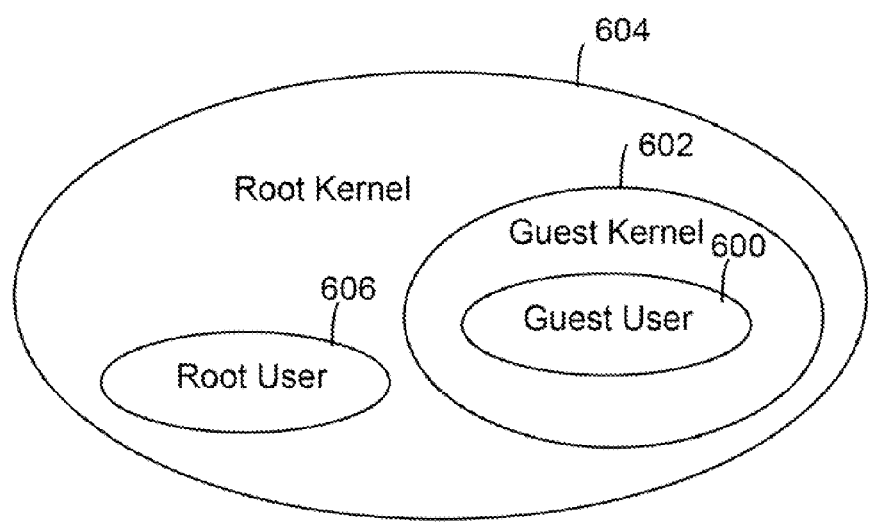
FIG. 6 illustrates control operations for guest user, guest kernel root user and root kernel processing modalities.

FIG. 6 illustrates concentric modes of control for address translation and exception handling utilized in accordance with an embodiment of the invention. At each layer, an operation must be permitted by all outer layers. So, for example, an operation by a guest user 600, must be permitted by the guest kernel 602 and then the root kernel 604. A root user 606 operation requires permission from the root kernel 604.

Programmable segmentation allows for the virtual address space segments to be programmed with different access modes and attributes. For example, control of the 4 GB of virtual address space may be divided into six segments that are controlled using memory segment configuration registers 211. In one embodiment these registers 211 are co-processor registers (CP0) specified as SegCtl0 through SegCtl2. Each register has 16-bit fields. Each field controls one of the six address segments as shown in Table I.

TABLE I

| Register | CP0 Location | Memory Segment | Register Bits | Virtual Address Space Controlled |
|---|---|---|---|---|
| SegCtl0 | Register 5 Select 2 | CFG0 | 15:0 | 3.5 GB to 4.0 GB |
|  |  | CFG1 | 31:16 | 3.0 GB to 3.5 GB |
| SegCtl1 | Register 5 Select 3 | CFG2 | 15:0 | 2.5 GB to 3.0 GB |
|  |  | CFG3 | 31:16 | 2.0 GB to 2.5 GB |
| SegCtl2 | Register 5 Select 4 | CFG4 | 15:0 | 1.0 GB to 2.0 GB |
|  |  | CFG5 | 31:16 | 0.0 GB to 1.0 GB |

Each 16-bit field in Table I contains information on the corresponding memory segment, such as address range (for kernel unmapped segments), access mode and cache coherency attributes. Table II describes the 16-bit configuration fields (CFG0-CFG5) defined in the SegCtl0-SegCtl2 registers.

TABLE II

CFGnFields

| Name | Bits | Description |
|---|---|---|
| PA | 15:9 and 31:25 | Physical address bits 31:29 for segment for use when unmapped. These bits are used when the virtual address space is configured as kernel unmapped to select the segment in memory to be accessed. For segments 0, 2 and 4, CFG[11:9] correspond to physical address bits 31:29. CFG[15:12] correspond to physical address bits 35:32 in a 36-bit addressing scheme and are reserved for future use. The state of CFG[15:12] are read/write and can be programmed, but these bits are not driven onto the address bus. For segments 1, 3, and 5, CFG[27:25] correspond to physical address bits 31:29. CFG[31:28] correspond to physical address bits 35:32 in a 36-bit addressing scheme and are reserved for future use. These bits are not used by the CFG4 and CFG5 spaces listed in Table I when these segments are programmed to be kernel mapped and the physical address is determined by the TLB. They are also not used for any of the user mapped (useg) region for the same reason. |
| Reserved | 8:7 and 24:23 | Reserved |
| AM | 6:4 and 22:20 | Access control mode. For programmable segmentation, these bits are set as shown in Table IV. Bits 6:4 correspond to segments 0, 2 and 4. Bits 22:20 correspond to segments 1, 2, and 5. |
| EU | 3 and 19 | Error condition behavior. Segment becomes unmapped and uncached when $Status_{ERL}$ = 1. Bit 3 corresponds to segments 0, 2 and 4. Bit 19 corresponds to segments 1, 2 and 5. |
| C | 2:0 and 18:16 | Cache coherency attribute for use when unmapped. For programmable segmentation, these bits are set as shown in Table IV. Bits 2:0 correspond to segments 0, 2 and 4. Bits 18:16 correspond to segments 1, 2 and 5. |

Other configuration registers may be used for kernel mode access to user space virtual addresses. For example, in the MIPS architecture, an enhanced virtualization address (EVA) bit may be used. In particular, the EVA bit in the Config5 register ($Config5_{EVA}$) is used to detect support for the enhanced virtual address scheme. This read-only bit is set to 1 to indicate support for EVA. In addition to the EVA bit, the SC bit in the Config3 register ($Config3_{SC}$) is used by hardware to detect the presence of the SegCtl0-SegCtl2 registers. This read-only bit is set to 1 to indicate the presence of these registers. The privileged software 228 may be used to write these values, for example, at boot time.

In addition to setting the $Config5_{EVA}$ and $Config3_{SC}$ bits, each memory segment is set to the programmable segmentation mode. Bits 6:4 (segments 0, 2 and 4) and bits 22:20 (segments 1, 3, and 5) of the SegCtl0 through SegCtl2 registers define the access control mode. To set the programmable segmentation registers to mimic the traditional MIPS32 virtual address mapping, the AM and C subfields of Table II of each 16-bit CFG field of the SegCtl0-SegCtl2 registers should be programmed as shown in Table III.

TABLE III

| SegCtl Register | CFGn | CFGn Sub-fieldAM | CFGn Sub-field C | Segment Size | Description |
|---|---|---|---|---|---|
| 0 | 0 (bits 15:0) | MK (bits 6:4 = 0 × 1) | 0 × 3 (bits 2:0) | 0.5 GB | Mapped kernel region. |
| 0 | 1 (bits 31:16) | MSK (bits 22:20 = 0 × 2) | 0 × 3 (bits 18:16) | 0.5 GB | Mapped kernel, supervisor region. |
| 1 | 2 (bits 15:0) | UK (bits 6:4 = 0 × 0) | 0 × 2 (bits 2:0) | 0.5 GB | Kernel unmapped, uncached region |
| 1 | 3 (bits 31:16) | UK (bits 22:20 = 0 × 0) | 0 × 3 (bits 18:16) | 0.5 GB | Kernel unmapped, cached region. |
| 2 | 4 (bits 15:0) | MUSK (bits 6:4 = 0 × 3) | 0 × 3 (bits 2:0) | 1.0 GB | User supervisor, and kernel mapped region. |
| 2 | 5 (bits 31:16) | MUSK (bits 22:20 = 0 × 3) | 0 × 3 (bits 18:16) | 1.0 GB | User, supervisor, and kernel mapped region. |

To set the programmable segmentation registers to implement the disclosed enhanced virtualization addressing, the AM and C subfields of each CFG field of the SegCtl0-SegCtl2 registers should be programmed as shown in Table IV.

TABLE IV

| SegCtl Register | CFGn | CFGn Sub-fieldAM | CFGn Sub-field C | Segment Size | Description |
|---|---|---|---|---|---|
| 0 | 0 (bits 15:0) | MK (bits 6:4 = 0 × 1) | 0 × 3 (bits 2:0) | 0.5 GB | Mapped kernel region. |
| 0 | 1 (bits 31:16) | MK (bits 22:20 = 0 × 2) | 0 × 3 (bits 18:16) | 0.5 GB | Mapped kernel, supervisor region. |
| 1 | 2 (bits 15:0) | MUSUK (bits 6:4 = 0 × 4) | 0 × 3 (bits 2:0) | 0.5 GB | Shared user mapped and kernel unmapped region. |
| 1 | 3 (bits 31:16) | MUSUK (bits 22:20 = 0 × 4) | 0 × 3 (bits 18:16) | 0.5 GB | Shared user mapped and kernel unmapped region. |
| 2 | 4 (bits 15:0) | MUSUK (bits 6:4 = 0 × 4) | 0 × 3 (bits 2:0) | 1.0 GB | Shared user mapped and kernel unmapped region. |
| 2 | 5 (bits 31:16) | MUSUK (bits 22:20 = 0 × 3) | 0 × 3 (bits 18:16) | 1.0 GB | Shared user mapped and kernel unmapped region. |

MUSUK is an acronym for Mapped User/Supervisor, Unmapped Kernel. This mode sets the kernel unmapped virtual address space to xkseg0. As shown in Table I, each of the six 16-bit CFGn fields of the SegCtl0 through SegCtl2 fields controls a specific portion of the virtual address range. Bits 31:15 (segments 0, 2 and 4) and bits 15:9 (segments 1, 3 and 5) of the SegCtl0 through SegCtl2 registers represent the state of the physical address bits 31:29 and defines the starting address of each segment. These bits control the six segments of the virtual address space. Each segment may be mapped to the SegCtl0 through SegCtl2 registers as shown in Table V.

TABLE V

| 4.0 GB - 3.5 GB | $CFG0_{PA} = 0 \times 7$ | SegCtl0, bits 15:9 (PA field) |
| 3.0 GB - 3.5 GB | $CFG1_{PA} = 0 \times 6$ | SegCtl0, bits 31:25 (PA field) |
| 2.5 GB - 3.0 GB | $CFG2_{PA} = 0 \times 5$ | SegCtl1, bits 15:9 (PA field) |
| 2.0 GB - 2.5 GB | $CFG3_{PA} = 0 \times 4$ | SegCtl1, bits 31:25 (PA field) |
| 1.0 GB - 2.0 GB | $CFG4_{PA} = 0 \times 2$ | SegCtl2, bits 15:9 (PA field) |
| 0.0 GB - 1.0 GB | $CFG5_{PA} = 0 \times 1$ | SegCtl2, bits 31:25 (PA field) |

For example, to program the xkseg0 region to a size of 3.0 GB, the PA field of each register would be programmed as shown in Table VI.

TABLE VI

| Register | CFGn Field | Bits | PA Field | Memory Segment | Virtual Address Range |
|---|---|---|---|---|---|
| SegCtl0 | CFG0 | 15:9 | 0 × 7 | kseg3 | 0 × E000_0000-0 × FFFF_FFFF |
| SegCtl0 | CFG1 | 31:25 | 0 × 6 | kseg3 | 0 × C000_0000-0 × DFFF_FFFF |
| SegCtl1 | CFG2 | 15:9 | 0 × 5 | kseg0 | 0 × A000_0000-0 × BFFF_FFFF |
| SegCtl1 | CFG3 | 31:25 | 0 × 4 | kseg0 | 0 × 8000_0000-0 × 9FFF_FFFF |
| SegCtl2 | CFG4 | 15:19 | 0 × 2 | xkseg0 | 0 × 4000_0000-0 × 7FFF_FFFF |
| SegCtl2 | CFG5 | 31:25 | 0 × 0 | xkseg0 | 0 × 0000_0000-0 × 3FFF_FFFF |

As previously indicated, new load/store instructions are used when the enhanced virtual address scheme is enabled. These kernel-mode user load/store instructions allow the kernel mapped access to user address space as if it were in user mode. For example, the kernel can copy data from user address space to kernel physical address space by using such instructions with user virtual addresses. Kernel system calls from user space can be conveniently changed by replacing normal load/store instructions with these instructions. Switching modes (kernel to user) is an alternative, but this is an issue if the same virtual address is being simultaneously used by the kernel. Further, there is a performance penalty in context-switching.

In one embodiment, the opcode for the instructions is embedded into bits 2:0 of the instruction, known as the Type field. Note that some fields can have the same encoding depending on whether the operation is a load or a store. The load/store designation is determined by bits 5:3 of the instruction. Table VII lists the new kernel load/store instructions.

TABLE VII

| Instruction Mnemonic | Instruction Name | Description |
|---|---|---|
| LBK | Load Byte Kernel | Load byte (as if user from) kernel extended virtual addressing load from user virtual memory while operating in kernel mode |

TABLE VII-continued

| Instruction Mnemonic | Instruction Name | Description |
| --- | --- | --- |
| LBUK | Load Byte Unsigned Kernel | Load byte unsigned (as if user from) kernel |
| LHK | Load Halfword Kernel | Load halfword (as if user from) kernel |
| LHUK | Load Halfword Unsigned Kernel | Load halfword unsigned (as if user) from kernel |
| LWK | Load Word Kernel | Load word (as if user from) kernel. |
| SBK | Store Byte Kernel | Store byte (as if user from) kernel extended virtual addressing load from user virtual memory while operating in kernel mode. |
| SHK | Store Halfword Kernel | Store halfword (as if user from) kernel |
| SWK | Store Word Kernel | Store word (as if user from) kernel |

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.).

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A method, comprising:
storing defined memory address segments and defined memory address segment attributes in registers of a processor; and
operating the processor in accordance with the defined memory address segments and defined memory address segment attributes, wherein operating includes:
overriding fixed memory address segments with fixed attributes associated with the processor, and
allowing kernel mode access to user space virtual addresses for enhanced kernel mode memory capacity.

2. The method of claim 1 further comprising executing virtual address load instructions from user virtual memory while operating in kernel mode.

3. The method of claim 2 wherein the virtual address load instructions are selected from load byte kernel, load byte unsigned kernel, load halfword kernel, load halfword unsigned kernel and load word kernel.

4. The method of claim 1 further comprising executing virtual address store instructions to virtual memory while operating in kernel mode.

5. The method of claim 4 wherein the virtual address store instructions are selected from store byte kernel, store halfword kernel and store word kernel.

6. The method of claim 1 wherein storing includes storing an access permission defined memory address segment attribute.

7. The method of claim 6 wherein storing includes storing an access permission selected from user mode, kernel mode and supervisor mode.

8. The method of claim 1 wherein storing includes storing a cache feature defined memory address segment attribute, wherein the cache feature defines access to addresses within a defined memory address segment.

9. The method of claim 1 wherein storing includes storing a memory map feature defined memory address segment attribute, wherein the memory map feature specifies use of a translation look-aside buffer for an address within a defined memory address segment.

10. A computer, comprising:
a memory; and
a processor connected to the memory, wherein the processor includes memory segment configuration registers to store defined memory address segments and defined memory address segment attributes such that the processor operates in accordance with the defined memory address segments and defined memory address segment attributes, wherein the processor operates to override fixed memory address segments with fixed attributes associated with the processor and the processor allows kernel mode access to user space virtual addresses for enhanced kernel mode memory capacity.

11. The computer of claim 10 wherein the processor executes virtual address load instructions from user virtual memory while operating in kernel mode.

12. The computer of claim 10 wherein the processor executes virtual address store instructions to virtual memory while operating in kernel mode.

13. The computer of claim 10 wherein the defined memory address segment attributes are selected from an access permission attribute, a cache attribute and a memory map attribute.

14. The computer of claim 10 wherein the memory stores a hypervisor.

15. The computer of claim 10 wherein the memory stores privileged software that writes to the memory segment configuration registers at boot time.

16. The computer of claim 15 wherein the privileged software alternately configures the memory segment configuration registers to fixed memory address segments and configurable memory address segments.

17. A processor, comprising:
memory segment configuration registers to store defined memory address segments and defined memory address segment attributes such that the processor operates in accordance with the defined memory address segments and defined memory address segment attributes, the processor overriding fixed memory address segments with fixed attributes associated with the processor and the processor allowing kernel mode access to user space virtual addresses for enhanced kernel mode memory capacity.

18. The processor of claim 17 wherein the processor executes virtual address load instructions from user virtual memory while operating in kernel mode.

19. The processor of claim 17 wherein the processor executes virtual address store instructions to virtual memory while operating in kernel mode.

20. The processor of claim 17 wherein the defined memory address segment attributes are selected from an access permission attribute, a cache attribute and a memory map attribute.

21. A non-transitory computer readable storage medium including executable instructions to define a processor, comprising:
    memory segment configuration registers to store defined memory address segments and defined memory address segment attributes such that the processor operates in accordance with the defined memory address segments and defined memory address segment attributes, the processor overriding fixed memory address segments with fixed attributes associated with the processor and the processor allowing kernel mode access to user space virtual addresses for enhanced kernel mode memory capacity.

22. The non-transitory computer readable storage medium of claim 21 wherein the processor executes virtual address load instructions from user virtual memory while operating in kernel mode.

23. The non-transitory computer readable storage medium of claim 21 wherein the processor executes virtual address store instructions to virtual memory while operating in kernel mode.

24. The non-transitory computer readable storage medium of claim 21 wherein the defined memory address segment attributes are selected from an access permission attribute, a cache attribute and a memory map attribute.

* * * * *